United States Patent [19]

Barker et al.

[11] 3,824,327

[45] July 16, 1974

[54] LIQUID FILLED CAPACITOR CASING WITH SEALED ALUMINUM COVER

[75] Inventors: Norman H. Barker, South Glens Falls; Edward A. Barlow, Glens Falls, both of N.Y.

[73] Assignee: General Electric Company, Hudson Falls, N.Y.

[22] Filed: Nov. 16, 1972

[21] Appl. No.: 307,158

[52] U.S. Cl............. 174/17 LF, 174/52 S, 317/242
[51] Int. Cl. ............................................. H05k 5/03
[58] Field of Search........... 174/52 S, 17 LF, 153 R; 317/242, 260

[56] References Cited
UNITED STATES PATENTS

| | | | |
|---|---|---|---|
| 1,497,415 | 6/1924 | Thomas | 317/260 X |
| 2,304,667 | 12/1942 | Taylor | 317/260 |
| 2,476,074 | 7/1949 | Unger | 174/153 R X |
| 3,243,668 | 3/1966 | Diggens | 317/242 X |
| 3,256,472 | 6/1966 | Centurioni | 317/260 |

FOREIGN PATENTS OR APPLICATIONS

| | | | |
|---|---|---|---|
| 258,646 | 7/1964 | Australia | 174/52 S |
| 513,636 | 10/1939 | Great Britain | 317/242 |
| 735,450 | 8/1955 | Great Britain | 317/260 |

*Primary Examiner*—E. A. Goldberg

[57] ABSTRACT

Electrical capacitor sealing means for the fill hole in an aluminum cover capacitor casing is disclosed wherein a dissimilar metal sealing member having a head and shank part has its shank passing through the fill hole and engaging the underside of the cover member. The head part is spaced from the external surface of the cover by means of a suitable sealing gasket to prevent corrosion therebetween. A preferred sealing member is a tin coated eyelet. The inner end of the eyelet is peened over to engage the cover while the enlarged head end is spaced from the cover by a gasket. Tin-lead solder applied to the eyelet seals said eyelet and the casing.

4 Claims, 2 Drawing Figures

PATENTED JUL 16 1974 3,824,327

LIQUID FILLED CAPACITOR CASING WITH SEALED ALUMINUM COVER

BACKGROUND OF THE INVENTION

Small industrial or motor run capacitors comprise a capacitor roll section sealed in a steel casing or can and impregnated with a liquid impregnant. The impregnant enters the casing through a small fill hole in the can cover, and after filling, the fill hole is sealed with a solder material.

With the advent of aluminum cans and covers the solder seal process, which is the most economical and satisfactory, is no longer applicable because of the difficulties of having ordinary tin-lead solders, and other substitutes, adhere to aluminum.

OBJECTS OF THE INVENTION

Accordingly it is an object of this invention to provide an improved sealing means for aluminum capacitor casings covers.

It is a further object of this invention to provide, in an aluminum capacitor casing cover, a dissimilar metal sealing member not only acts as a liquid seal, but also seals off intermediate areas of potential corrosion.

It is another object of this invention to provide in an aluminum capacitor casing cover a dissimilar metal eyelet member which can utilize tin-lead solder seal means.

BRIEF DESCRIPTION OF THE INVENTION

In a preferred form of this invention a tin coated steel eyelet passes through an aluminum cover member in a capacitor casing. The eyelet is retained in the cover member because it has a head end which is larger than the cover hole to prevent its passing therethrough. An annular nonmetal compressive gasket is positioned on the eyelet between the head end and the cover to space and insulate the head from the cover. At the inner surface on underside of the cover which is exposed interiorly of the capacitor the eyelet is merely peened over to engage the cover. After filling the capacitor with a suitable liquid impregnant through the eyelet, the ordinary tin-lead solders may be used to seal the eyelet.

DESCRIPTION OF PREFERRED EMBODIMENTS

Figure 1:
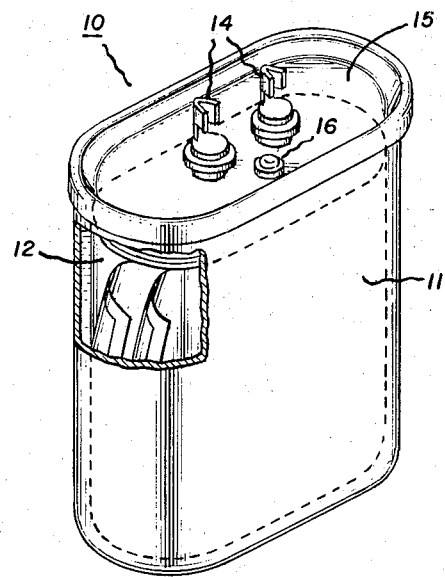

Referring now to FIG. 1 there is shown a typical liquid impregnated small industrial or motor run capacitor 10. Capacitor 10 comprises a casing 11 in which there is a capacitor roll section 12 connected by appropriate leads (not shown) to external terminals 14 in a cover 15. The capacitor roll section 12 is impregnated with a suitable impregnant and may be submerged in the impregnant which fills the casing 11. Accordingly cover 15 is sealed to the casing 11 to prevent leakage of the impregnant.

In the manufacture of such a capacitor 10, the roll section 12 is usually assembled to the cover 15, this subassembly is fitted to the casing 11, and the cover unit sealed to the casing as the final assembly. In order to impregnate the roll section 12 in capacitor 10, the cover 15 is provided with a small opening or fill hole 16 therein. The casing is submerged in an impregnant in an evacuated chamber and the impregnant is caused to flow through the fill hole 16. After the casing 11 becomes filled with impregnant the capacitor 10 is removed from the chamber and the fill hole 16 suitably sealed, for example, by a small drop of solder.

Progress in capacitor manufacture had led not only to the use of aluminum casings and covers, but also to the use of very thin aluminum. For example aluminum covers in the range of 0.020 to 0.025 inch thickness are now advocated or in use. A major problem associated with such thin gauge aluminum covers is the sealing of the fill hole 16. Most of the usual mechanical means will not operate effectively in such thin gauge aluminum because of its flexibility and softness. On the other hand, the most common and economical means, soldering, is not applicable because of the known difficulties of soldering to aluminum with ordinary tin-lead solders.

Figure 2:
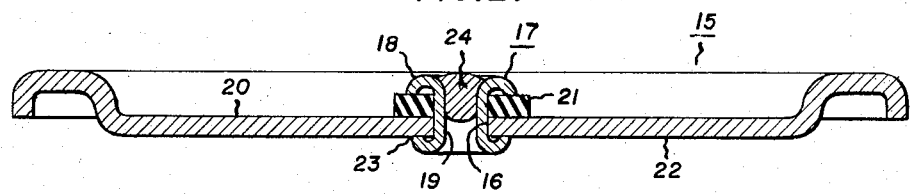

The foregoing problems have been solved by the fill hole seal means of this invention. Referring to FIG. 2, the cover 15 is illustrated together with its fill hole 16. Within fill hole 16 there is positioned an eyelet 17. In a preferred form of this invention eyelet 17 comprises a hollow or tubular metal member with a head end 18 which is defined as a reverse fold or upset rim and a shank part 19. The head end 18 is adjacent the external surface 20 of cover 15 and is also exteriorly of the capacitor. Eyelet 17 is a common device used to facilitate boot lacings, etc. and may also be described as a hollow rivet. In the present invention eyelet 17 is chosen to be of a material to which ordinary tin-lead solder will adhere, such as brass, or is coated with a tin-lead solder adhering material. In one preferred example of this invention the eyelet 17 is a tin coated steel eyelet. Therefore either the steel of the eyelet or the tin coating of the eyelet which are exposed to or in contact with the cover 15 is of a metal other than aluminum and corrosion becomes a problem.

Corrosion between the eyelet 17 and the cover 15 can be serious since the tapacitor 10 must remain sealed liquid tight for many years in all kinds of environments. It is necessary therefore to insulate or protect eyelet 17 from cover member 15 whenever the joint might be exposed to corrosive conditions which includes ordinary atmospheric conditions. It has been found that a suitable annular gasket 21, of silicone rubber for example, may be placed on the eyelet shank 19 adjacent to and surrounding the head 18 to therefore space the head 18 from the cover 15 to prevent corrosion of this juncture. Ordinarily the gasket material is sufficiently elastic or compressible under the conditions of manufacture and assembly that it compressively seals between the eyelet 17 and the cover 15. The gasket material should be nonreactive with respect to the liquid impregnant and essentially impervious to the impregnant. The outer periphery of head 18 is spaced from the cover 15 and no corrosion is expected. Where the shank 19 of the eyelet 17 passes through fill hole 16 and may engage the cover in passing, the environment is actually that of the internal environment of the capacitor. The internal environment is one of an impregnant filled and evacuated casing or can, and is therefore essentially noncorrosive.

At the internal surface or underside 22 of the cover, the eyelet shank 19 is merely peened over or riveted flush against the cover 15. No corrosion problem is expected at this juncture 23 because the juncture is within the evacuated and sealed casing 11, and so long as these conditions prevail, which is usually over the life of the capacitor, no leakage is expected.

The final operation is the sealing of eyelet 17 by a drop of solder 24 as indicated in FIG. 2. Ordinary tin-lead solders such as 60-40 or 50—50 tin-lead solders provide an effective seal particularly with a tin coated eyelet 17. Therefore, after impregnation or filling of the casing 11, molten solder is applied to the bore of the eyelet and the relatively viscous solder passes into the bore and solidifies to seal the capacitor.

This invention thus provides an effective low cost seal for aluminum capacitor covers which is adaptable to the present manufacturing processes and equipment for soldering fill holes in capacitor covers. It may be desirable in some instances to use different solders for sealing or even nonmetallic materials such as resins. In this connection different metals may be employed for the eyelet. Aluminum covers may still present corrosion and sealing problems, and this invention is applicable to provide a non aluminum sealing surface in the eyelet.

In another form of this invention, the eyelet member 17 having a head end 18 and shank part 19 may be replaced with other such members having similar parts including for example a self-tapping sheet metal screw. In this instance a suitable gasket member will space the head of the screw from the cover and the screw thread will provide mechanical engagement means with the cover 15.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by letters Patent of the United States is:

1. In a sealed capacitor casing having a liquid impregnant therein a sealing means therefore comprising in combination
   a. an aluminum cover member having a fill hole therein
   b. an eyelet extending through said fill hole in said cover
   c. said eyelet having a metal surface exposed to said cover which is a metal other than aluminum
   d. said eyelet having an enlarged head end at the external surface of said cover
   e. a nonmetallic compressive gasket member on said eyelet and surrounding said head end to seal and insulate said head end from said cover member
   f. said eyelet having a riveted metal to metal joint at the underside surface of said cover.

2. The invention as recited in claim 1 wherein said gasket is an elastomer and said eyelet is steel.

3. The invention as recited in claim 2 wherein said eyelet is tin coated.

4. The invention as recited in claim 3 wherein said eyelet is solder sealed with a tin-lead solder.

* * * * *